Figure 1:
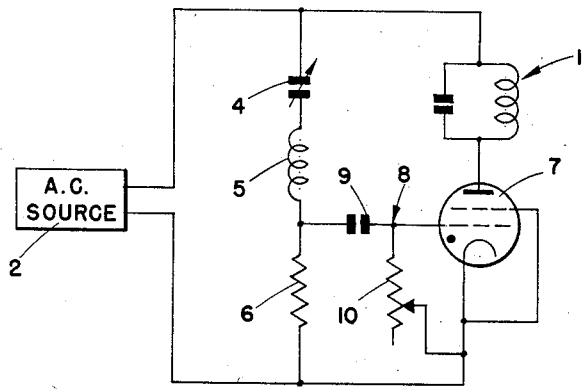

Jan. 5, 1960  T. E. CURTIS  2,920,263
FREQUENCY REGULATING SYSTEM
Filed March 18, 1954

INVENTOR.
THOMAS E. CURTIS
BY William R. Lane
ATTORNEY

United States Patent Office 2,920,263
Patented Jan. 5, 1960

2,920,263
FREQUENCY REGULATING SYSTEM

Thomas E. Curtis, Downey, Calif., assignor to North American Aviation, Inc.

Application March 18, 1954, Serial No. 417,181

6 Claims. (Cl. 322—32)

This invention relates to frequency regulating systems and particularly to an improved frequency sensitive device useful for stabilizing the frequency of the output voltage of a generating device.

Many constant-speed, rotational devices, such as the rotor motors of a gyroscope, must maintain with great precision a constant angular velocity. These devices depend for their accuracy on being connected to a source of A.-C. voltage which has a highly stabilized frequency. Most of the conventional motor-generator sets, which have been produced in the past, generated output voltages which varied considerably in frequency with changes in load conditions. This was particularly true of airborne motor-generator sets which were utilized as sources of comparatively low-magnitude power. Various devices have been developed for improving the frequency stability of such motor-generator sets. In general, these frequency regulating devices have exercised control over the output frequency by utilizing changes in the phase angle between the output voltage and some constant frequency reference voltage. However, the frequency regulating device must have a very short response time. That is, the detection and correction of any frequency deviations from a preset value must be very rapid. It has been found that exercising control over the output frequency by utilizing the phase angle between the output voltage and the voltage from some constant frequency reference oscillator generally resulted in too slow a response time for high precision applications. Greatly improved frequency stability is obtained in accordance with this invention by using a rate component of frequency deviations in conjunction with the phase error component. The frequency sensitive device contemplated by this invention produces a signal output which is a function of the rate component of frequency deviations. When used in conjunction with a phase sensitive device, a very rigid frequency control is achieved.

It is therefore an object of this invention to provide an improved frequency sensitive device having an output responsive to frequency deviations.

It is another object of this invention to provide a frequency sensitive device utilizing a grid-controlled gas-filled tube.

It is another object of this invention to provide a frequency sensitive device which utilizes the phase shift of the current in a series resistance-reactance network to vary the firing angle of a grid-controlled, gas-filled tube in response to frequency deviations of the A.-C. voltage applied to said series network and to the plate of said tube to thereby obtain an output which is a function of said frequency deviations.

It is a further object of this invention to provide a frequency sensitive device for obtaining an output which is a function of the frequency of an input voltage comprising a grid-controlled, gas-filled tube and a load impedance connected in series across the input voltage; a series capacitive-inductive-resistive network subject to the input voltage, said network being highly reactive and tuned to resonance at a predetermined frequency near the frequency of said input voltage; and a phase shifting network coupling, with a predetermined phase shift, the voltage across the resistive impedance of said series network to the grid of said tube whereby the voltage across the load impedance is an accurate measure of the frequency of the input voltage.

It is another object of this invention to provide an improved frequency regulating system.

It is another object of this invention to provide a frequency regulating system for stabilizing the output frequency of a source of A.-C. voltage comprising means for varying the output frequency of the A.-C. source in response to current flow; a grid-controlled, gas-filled tube subject to the output voltage of the A.-C. source; a series RCL network subject to said output voltage and tuned to resonate at a frequency slightly above the desired output frequency; phase shifting means coupling the voltage across the resistor of the series RCL network with a phase lag of predetermined magnitude to the grid of said tube; and means subjecting the output frequency varying means to the current through said tube whereby deviations of said output frequency from said predetermined value result in actuation of said frequency varying means to restore said output frequency to the predetermined value.

Figure 2:
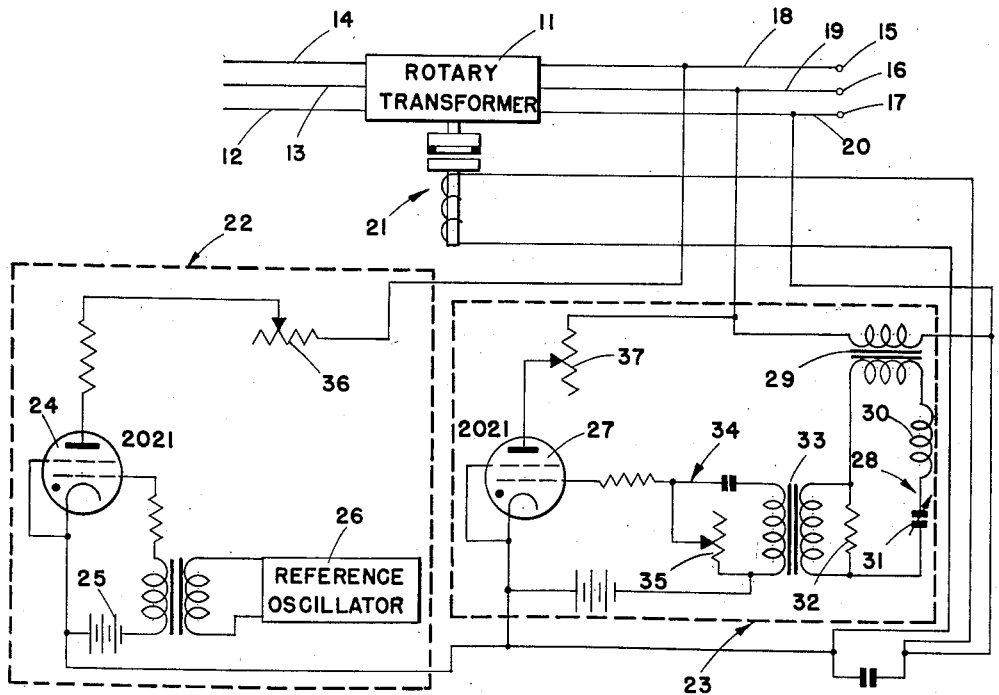

Other objects of invention will become apparent from the following description taken in connection with the accompanying drawings, in which Fig. 1 is a schematic drawing of a preferred embodiment of the frequency sensitive device contemplated by this invention;

And Fig. 2 is a schematic drawing of a frequency regulating system utilizing the frequency sensitive device of Fig. 1 to obtain a source of A.-C. potential with high frequency stability.

Referring now to Fig. 1, an improved frequency sensitive device is shown. It is desired to obtain an output signal across load impedance 1 which is a function of the frequency deviations of the output voltage of source 2. Series RCL network 3, consisting of capacitor 4, inductor 5, and resistor 6, is subjected to the output voltage of source 2. This series network is tuned to a resonant frequency approximately equal to but preferably slightly above the normal frequency of source 2. Assume the applied voltage $v$ of source 2 is $$v = V_m \sin \omega t \tag{1}$$

where $V_m$ is the peak input voltage. The resulting current $i$ in series network 3 is $$i = \frac{V_m}{\sqrt{R_T^2 + \left(\omega L - \frac{1}{\omega C}\right)^2}} \sin(\omega t - \theta) \tag{2}$$

where $\theta$ is the phase angle of resulting current $i$ with respect to applied voltage $v$. This angle $\theta$ is then $$\theta = \tan^{-1}\left(\frac{\omega L - \frac{1}{\omega C}}{R_T}\right) \tag{3}$$

Since voltage $v_r$ across resistor 6 is always in phase with the resulting current $i$, angle $\theta$ is also the phase angle between voltage $v_r$ and the applied voltage $v$. It will be noted from Equation 3 that the magnitude of angle $\theta$ depends on the frequency $f$ of the input voltage $v$. This is apparent since $\omega = 2\pi f$ and a change in $\omega$ changes the capacitive and inductive factors of the equation. Therefore, the phase relationship between the applied voltage $v$ and the voltage $v_r$ is a predeterminable function of the frequency of the input voltage. When the resonant frequency of network 3 is above the frequency of source 2, current $i$ leads voltage $v$ by angle $\theta$. As the frequency $f$ increases toward the resonant value, angle $\theta$ decreases. At resonance, $\theta$ is equal to zero.

Grid-controlled, gas-filled tube 7, such as a thyratron is connected in series with load impedance 1 across source 2. Tube 7 is characterized by grid control over the time of beginning conduction. However, a reduction in plate voltage is necessary to cause subsequent extinguishment. Thus, although the plate of tube 7 has a positive potential impressed upon it, the tube does not conduct until the potential on the grid reaches a suitable potential. Subsequent to this "firing," as it is called, the grid potential has no further effect on the current flowing in the tube. The plate circuit of tube 7 is subjected to the A.-C. potential from source 2. The conduction of tube 7 is therefore extinguished each time the plate voltage goes negative and does not refire until a predetermined time after the beginning of the next cycle. The firing angle of the grid of the tube is the phase angle between the time of firing and the beginning of the positive half-cycle of plate voltage. Assuming a substantially constant amplitude A.-C. potential applied to the plate of the tube, the average current through the tube is a function of the firing angle. The relative change in average current with changes in firing angle is more pronounced when the range of firing angles is selected very late in each cycle. Thus, a change in firing angle in the vicinity of the last ten degrees of the positive plate cycle (i.e. points in the cycle which lag the beginning of the positive cycle by about 170 degrees) has a much greater effect on the average plate current than a change in firing angle in the vicinity of the first ten degrees of the cycle. Load impedance 1 effectively averages the current through tube 7.

Phase shifting network 8 consisting of coupling capacitor 9 and grid resistor 10 couples the voltage $v_r$ across resistor 6 to the grid of tube 7 with a predetermined phase shift. The magnitude of the phase shift caused by network 8 is adjusted by varying the setting of resistor 10 to normally cause tube 7 to fire very late in the cycle. As long as the frequency of the output voltage from source 2 remains at some fixed value, the average current through tube 7 as measured by load impedance 1 remains constant. However, if the frequency increases, series network 3 is more nearly at resonance and current $i$ leads voltage $v$ by a smaller phase angle $\theta$. This results in a decrease in the phase angle between voltages $v_r$ and $v$. The firing of tube 7 is further delayed resulting in a material decrease in the average current flowing through the tube. This decreased current is detected by load impedance 1.

Referring now to Fig. 2, a particular circuit in which this frequency sensitive device is useful as a component part of a frequency regulator is shown. In this embodiment rotary transformer 11 is utilized as the source of A.-C. voltage whose output frequency is to be precisely regulated. Three phase voltage from a source (not shown) which is not frequency regulated is coupled by wires 12, 13 and 14 to the stator windings of rotary transformer 11. The rotor windings of transformer 11 are connected to output terminals 15, 16 and 17 by wires 18, 19 and 20, respectively. Rotary transformer 11 is essentially a wound rotor induction motor with a very high slip $s$. Despite the frequency instability of the voltage supplied to the stator windings, a constant frequency voltage output is obtained by appropriate regulation of the slip of the rotor. The slip is regulated by means of a magnetic clutch which exerts a braking torque on the rotor. The slip varies inversely with changes in the magnitude of the current flowing through the clutch coil. Thus an increase in coil current, increases the braking torque on the rotor and results in a corresponding decrease in slip $s$. Slip is defined as the ratio of actual rotor speed to synchronous motor speed. The output frequency $f_0$ from the rotor windings is $$f_0 = (1-s)f \quad (4)$$

where $s$ is the slip and $f$ is the frequency of the voltage impressed on the stator windings. It can readily be seen from Equation 4 that the output frequency can be maintained constant if the slip is varied an amount sufficient to compensate for variations in the input frequency. The frequency regulating circuit described below accomplishes this variation in slip by controlling the rate of flow of current through clutch coil 21 to thereby vary the braking torque impressed on the rotor of transformer 11.

Two separate circuits control the magnitude of the current flowing in clutch coil 21. These circuits consist of phase error detector 22 and rate error detector 23. Phase error detector 22 consists of grid-controlled, gas-filled tube 24 which is connected in series with clutch coil 21 across one phase of the output voltage. A D.-C. bias is impressed on the grid of tube 24 by D.-C. source 25. Superimposed by this D.-C. bias voltage is a constant frequency reference signal from reference oscillator 26. Normally tube 24 fires during only a part of the positive plate cycle. As long as the output frequency of transformer 11 remains in a predetermined phase relationship with the signal from reference oscillator 26, the current flow through tube 24 and hence a component of the current flowing through clutch coil 21 remains constant. When the frequency of the output voltage deviates from this predetermined value, there is a progressive change in the phase relationship between the plate voltage and the grid voltage. Assuming an increase in output frequency, the average current through tube 24 decreases progressively as the grid voltage lags farther behind the plate voltage. In response to this current change through clutch coil 21, the clutch generates a braking torque on the rotor of transformer 11 in a direction to restore the predetermined phase relationship. It is to be noted, however, that used alone this form of control over the output frequency has a very slow response time. It further has a high tendency to hunt or oscillate about the desired frequency. It is clear that the magnitude of the correction factor is not determined by the absolute frequency deviation but is rather dependent on the instantaneous phase deviation. Thus, although the frequency of the output is the desired value, if the phase relationship is in error, the clutch is still actuated causing an undesired shift in frequency.

To prevent this overcorrection and improve the response time, rate error detector 23 is also used to control the amount of current flowing in clutch coil 21. Rate error detector 23 is very similar to the frequency sensitive device of Fig. 1. Grid-controlled, gas-filled tube 27 is connected in series with clutch coil 21 across one phase of the output voltage of transformer 11. Preferably this phase is different from the one used to supply plate voltage to tube 24. Series impedance network 28 is subjected to the same output voltage through transformer 29. Network 28 consists of inductor 30, capacitor 31, and resistor 32. This series network is preferably tuned to resonate at a frequency slightly above the desired output frequency. For example, if an output voltage with a very stable frequency of 385 c.p.s. is desired, network 28 is tuned to approximately 400 c.p.s. An applied voltage of 385 c.p.s. causes the current through resistor 32 to lead the secondary voltage of transformer 29 by an angle $\theta$. The voltage across resistor 32 is coupled to the grid of tube 27 by means of transformer 33 and phase shifting network 34. The setting of potentiometer 35 of network 34 is adjusted to cause tube 27 to normally fire very late in the cycle.

When the output frequency of transformer 11 deviates from 385 c.p.s., the voltage across resistor 32 shifts in phase. Thus, if the output frequency increases to 400 c.p.s., the current through resistor 32 is in phase with the secondary voltage of transformer 29. The voltage coupled to the grid of tube 27 therefore lags farther behind the plate voltage. This changes the firing time of tube 27 substantially as described above with respect to Fig. 1. The resulting change in the average current flowing through tube 27 and clutch coil 21, as a result of this change in firing time, actuates the clutch to generate a braking torque on the rotor of transformer 11 in a direction to restore the output frequency to its predetermined value.

It is to be noted that detectors 22 and 23 both normally act to restore the output frequency of transformer 11 to its predetermined value. The relative effects of the two detectors is adjusted by varying the settings on potentiometers 36 and 37 on the plate circuits of tubes 24 and 27, respectively. The settings of potentiometers 36 and 37 determine the magnitudes of the currents flowing through tubes 24 and 27, respectively. Preferably rate detector 23 causes a much greater change in the current flow through clutch coil 21 for a given frequency deviation than does phase detector 22. Phase detector 22 is used primarily as a lock-in device while rate detector 23 is used as the deviation compensating device.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A frequency sensitive device comprising a grid-controlled, gas-filled tube, and means sensitive only to the frequency of the plate voltage on said tube for controlling the firing angle of the grid of said tube in response to the frequency of the plate voltage of said tube whereby the average current flowing through said tube is a measure of said frequency, said means including means for normally maintaining said firing angle slightly less than 180 degrees.

2. A frequency sensitive device for obtaining an output which is a function of the frequency of an input voltage comprising a grid-controlled, gas-filled tube; a load impedance connected in series with said tube; means subjecting said series network to said input voltage; a series tuned circuit having resistive, inductive, and capacitive impedances, said tuned circuit being tuned to resonate at a frequency slightly above the frequency of said input voltage; means subjecting said series tuned circuit to said input voltage; and a phase shifting network coupling the voltage across the resistive impedance of said series tuned circuit with a predetermined phase shift to the grid of said tube whereby the firing angle of said input voltage and the average voltage drop across said load impedance is an accurate measure of said frequency.

3. Means for regulating the frequency of an alternating current source at a predetermined value comprising a grid-controlled, gas-filled tube subjected to the output voltage of said source; means sensitive only to the frequency of said output voltage for varying the firing angle of said tube in response to the frequency of said output voltage; said last-mentioned means including adjustable means for limiting the flow of current through said tube to approximately ten degrees of the cycle of said output voltage at said predetermined value; and means responsive to the current flowing through said tube for varying the frequency of the output of said source in a direction to maintain said frequency at said predetermined value.

4. Means for regulating the frequency of an alternating current source at a predetermined value comprising phase error detector means; rate error detector means having a grid-controlled, gas-filled tube, a series tuned RCL network subjected to the output voltage of said source and means responsive to the phase angle between the current through said series network and the applied voltage for varying the firing angle of said tube; and means responsive to the magnitude of the outputs of said phase and rate error detector means for varying the frequency of said source in a direction to return said frequency to said predetermined value whereby frequency deviations of said source are rectified with a short response time.

5. A frequency regulating system for stabilizing at a predetermined value the frequency of a source of alternating voltage comprising means for varying the output frequency of said source in response to current flow; a grid-controlled, gas-filled tube subject to the alternating voltage of said source; a series tuned RCL network subject to said alternating voltage and tuned to resonate at a frequency substantially equal to said predetermined stabilized frequency; phase shifting means coupling the voltage across the resistor of said series RCL network with a phase lag of predetermined magnitude to the control grid of said tube; and means subjecting said output frequency varying means to the current through said tube whereby deviations of said output frequency from said predetermined value result in actuation of said frequency varying means to restore said output frequency to said predetermined value.

6. A frequency regulating system for stabilizing at a predetermined value the frequency of the alternating voltage from a source comprising a rotary transformer whose speed of rotation determines the frequency of the output voltage; friction clutch means having a clutch coil and positioned to exert braking torques on said transformer as a function of the current flowing in said clutch coil; a reference source of oscillating voltage of said predetermined frequency of said output voltage; phase error detection means connected in series with said clutch coil and adapted to produce current flow through said coil as a function of the phase relationship between said output voltage and said reference voltage; and rate deviation detector means connected in series with said clutch coil and adapted to produce current flow through said coil as a function of said output frequency, said rate deviation detector means comprising a grid-controlled, gas-filled tube connected in series with said clutch coil and subjected to said output voltage and tuned to resonate at a frequency substantially equal to said predetermined frequency of said output voltage; and phase shifting means coupling the voltage drop across the resistor of said RCL network with a phase lag of predetermined magnitude to the control grid of said tube whereby the speed of rotation of said transformer is continuously controlled to maintain the frequency of said output voltage constant.

References Cited in the file of this patent

UNITED STATES PATENTS

| | | |
|---|---|---|
| 1,719,866 | Alexanderson | July 9, 1929 |
| 2,074,126 | Mead | Mar. 16, 1937 |
| 2,292,397 | Overbeck | Aug. 11, 1942 |
| 2,459,551 | Steinmetz | Jan. 18, 1949 |
| 2,468,569 | Mead | Apr. 26, 1949 |
| 2,541,879 | Martin | Feb. 13, 1951 |
| 2,685,670 | Horrell | Aug. 3, 1954 |